Patented Feb. 26, 1952

2,587,523

UNITED STATES PATENT OFFICE 2,587,523

PROCESS FOR FORMING A GLAZE ON CARBON

Charles H. Prescott, Jr., Berkeley, Calif.

No Drawing. Application May 6, 1948,
Serial No. 25,530

7 Claims. (Cl. 117—46)

The present invention relates to a coating upon carbon and more particularly to the coating of a refractory oxide upon carbon at elevated temperatures; to methods of applying said coating; and to the maintaining of this coating of refractory oxide upon carbon.

It is a recognized fact that carbon has a higher tensile strength and rigidity at elevated temperatures than has the same substance at those temperature ranges of a lower level; that is, the tensile strength of carbon increases as the temperature increases.

In order to prevent oxidation and general deterioration of carbon structural elements at high temperatures, it has been found necessary to provide the carbon element with a glaze or coating of a highly refractory oxide which can withstand very high temperatures thereby affording the desired protection for the carbon element.

It the search for materials capable of withstanding temperatures in the range of 1200 degrees C. to 1300 degrees C. which are far beyond the possible utility limits of the Stellite steels and other temperature resistant stainless steels, attention has been directed to structural elements such as carbon which is capable of withstanding temperatures within and above this range, while at the same time maintaining high tensile strength and rigidity normally associated with high grade steels at much lower temperatures.

From the foregoing it may be clearly seen from both a theoretical and a practical aspect that the solution of this difficulty should be a decided advance over the art and be capable of manifold applications which pertain to high energy production at elevated temperature levels.

It is therefore an object of the present invention to provide a simple process for the deposition of a tenacious and highly resistant refractory oxide coating upon carbon which will withstand the aforesaid effects which heretofore have resulted in general deterioration necessitating replacement of the carbon element.

It is a further object of the invention to provide a refractory oxide coated carbon structural element possessing great mechanical strength and extreme resistance to oxidation particularly at high temperatures and pressures.

It is a further object of the invention to provide a refractory oxide coated carbon structural element in which a chemical equilibrium is maintained between the oxide coating and the carbon element throughout a wide range of temperature and pressure conditions.

Other objects and advantages will be apparent in the following descriptions and claims.

It is well known from the second law of thermodynamics that:

The limiting efficiency of any cycle $= \dfrac{T_2 - T_1}{T_2}$ where $T_2$=initiation temperature of the system, and $T_1$=the cessation temperature of the system.

From the above it appears that an increase in $T_2$ is highly significant from the standpoint of efficiency. The application of this relationship to high temperature energy producing systems, such as those dealing with turbo jet propulsion, makes manifest the solution of this high temperature impasse. Structural elements capable of withstanding increased temperatures without substantial change in basic structure and composition, even under the most adverse conditions, are the desideratum in other types of high temperature and high efficiency energy producing engines (e. g. gas turbines for locomotives).

The reaction:

$$ThO_2 + 4C = ThC_2 + 2CO$$

has been investigated by the inventor and the equilibrium of the system has been shown to be univariant. It follows, therefore, that no solid solutions or other undesirable complications occur throughout the equilibrium.

According to the principle of Le Chatelier, if a change occurs in one of the factors. temperature or pressure, under which a system is in equilibrium, the system will tend to adjust itself so as to annul, as far as possible, the effect of that change. Thus, if $ThO_2$ and C are heated together at a sufficiently high temperature for reaction to occur, CO will be generated until equilibrium pressure has been reached. Experiments with this reaction show that for every temperature there corresponds one equilibrium pressure. This fact is not affected by the ratio of carbon to thoria. It is known also that over any range of composition, the reaction pressure may be maintained to just exceed the equilibrium value. At carbon monoxide pressures over the equilibrium values, the thoria and graphite will not react at all. At substantially lower pressures, temperature being maintained at a constant in a high range, an interface of thorium carbide will form.

As a practical matter, particularly in the field of jet propulsion, operation at higher temperatures is usually accompanied with the production of CO gas. This CO exhaust gas production can be so controlled that as the temperature increases to such an extent as to shift the equilibrium in one direction, pressure of the exhaust gases proportionally increases in such a manner as to keep the desired reaction at equilibrium conditions during all phases of the operation of the propulsion device. At low temperatures, because the rate of reaction is so small, no reaction is to be expected. As the temperature increases at constant CO pressure, reaction will occur when the temperature exceeds the corresponding equilibrium temperature, but as temperatures increase beyond that of the conditions of equilibrium, then increase in the pressure of the CO gas will reverse the reaction or inhibit reaction if no carbide is present. The conditions just described are those under which a glaze may be deposited and/or maintained on a carbon element without attack of the carbon or formation $ThC_2$.

The effects of this are clearly evident in the production of a carbon structural element, coated with a permanent refractory oxide glaze, thereby combining the desired characteristics of high tensile strength, especially at high temperatures well above the possible operating range of the top grade steels, with the especially desirable feature of durability and long life without marked deterioration which would otherwise necessitate replacement of used structural elements at such a rapid rate as to detract from utility and increase expenses by a prohibitive amount.

In the present invention, alternative methods for the deposition of a refractory oxide on the carbon structural members may be utilized. A preferred method of depositing the refractory oxide on the carbon structural elements comprises spraying the carbon member with a coating of thorite ($ThSiO_4$) and evaporating the silica therefrom. A vehicle of the cellulose nitrate type, such as Pyroxylin, in a low boiling organic ester solvent, such as amyl acetate, is used as a medium for the thorite. Thorium compounds, having the characteristic of decomposing at relatively low temperatures, such as thorium nitrate ($Th(NO_3)_4$) may be added to the spray coating mixture for the purpose of increasing adherence at intermediate temperatures. After spraying, the coated carbon member is then heated to 2350 degrees K. in a stream of CO.

The desirability of utilizing a temperature of 2350 degrees K. will be apparent from the following discussion.

For the fundamental reaction:

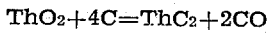
$$ThO_2 + 4C = ThC_2 + 2CO$$

the equilibrium pressure is one atmosphere at 2395 degrees K., while the boiling point of silica is 2500 degrees K. This does not mean that a temperature of 2500 degrees K. is necessary to evaporate the $SiO_2$. The vapor pressure at 2400 degrees K. is high enough for rapid removal. If, however, temperature is raised to remove the silica more rapidly, the CO pressure must be raised to above the new equilibrium pressure.

At temperatures above 2200 degrees K., silica will react with carbon according to the following equation:

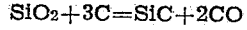
$$SiO_2 + 3C = SiC + 2CO$$

Since SiC is more volatile than Si, it has been found advantageous to add carbon to the coating mixture in order to prevent the side reaction:

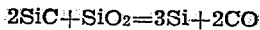
$$2SiC + SiO_2 = 3Si + 2CO$$

This additional carbon forces the reaction to proceed in favor of the formation of SiC, which sublimes at a temperature of 2300 degrees K. and decomposes at 2500 degrees K.

Hence, the considerations just mentioned make obvious the advantages of removing the Si in the form of SiC in lieu of volatilizing it in the form of $SiO_2$, which requires a slightly higher temperature. Addition of carbon also minimizes the possibility of reaction of the silicon with the carbon element. The addition of too much carbon is to be avoided. A little less than the stoichiometric amount is used, which is not enough to leave any residue in the coating.

Refractory oxides, other than the oxide of thorium, can also be successfully coated on carbon using the same procedure. These oxides similarly form relatively non-volatile carbides. Included in this group are the elements hafnium and zirconium.

As an additional variant in the process, other systems intermediate between carbonate and silicate can be used to give the flux from which a glaze of refractory oxide may be precipitated while the more volatile components are driven off by heating. For example, phosphates and borates can be used in place of the silicate. The advantage of using these systems is found in the fact that reactions involving phosphates or borates occur at much lower temperatures because of the lower melting points of such compounds.

What is claimed is:

1. In a process for forming an adherent surface glaze of refractory oxide of an element selected from the group consisting of thorium, hafnium, and zirconium bonded directly to the surface of a carbon structure, the steps comprising coating said carbon structure with a compound of said element selected from the group consisting of silicates, borates and phosphates dispersed in a cellulose nitrate vehicle, and thereafter heating the coated carbon structure to a temperature in the range of 2350° K. to 2500° K. in the presence of an atmosphere of carbon monoxide gas having a pressure slightly in excess of the equilibrium pressure thereof in the reaction

$$XO_2 + 4C = XC_2 + 2CO$$

where X is one of said elements whereby said compound of said elements is decomposed producing said surface glaze of a refractory oxide thereon while the remainder of the coating including the vehicle and remnants of the compound are vaporized therefrom.

2. The process according to claim 1 wherein said compound of said element is a silicate.

3. The process according to claim 1 wherein said compound of said element is a borate.

4. The process according to claim 1 wherein said compound of said element is a phosphate.

5. In a process for forming an adherent surface glaze of refractory oxide of an element selected from the group consisting of thorium, hafnium, and zirconium on a carbon structure, the steps comprising preparing a dispersion of a silicate of said element and the proportion of carbon required to convert the silicon content of said silicate into silicon carbide, in a cellulose nitrate vehicle, coating said carbon structure with said dispersion, and then heating the coated carbon structure to a temperature in the range of from 2350° K. to 2500° K. in a stream of CO gas wherein the pressure of CO is slightly in excess of the equilibrium value thereof in the reaction $XO_2+4C=XC_2+2CO$ where $X$ represents one of said elements, whereby the silicate of said element is decomposed thereby producing said adherent surface glaze and silicon of said silicate is vaporized as silicon carbide therefrom.

6. The process for producing an adherent surface glaze of thoria upon a carbon structural element comprising spray coating said structural element with a mixture of thorite and thorium nitrate dispersed in a cellulose nitrate vehicle together with a little less than the amount of carbon required to convert the silicon content of the thorite into silicon carbide, and heating the coated element in an atmosphere of carbon monoxide having a pressure of carbon monoxide therein slightly above the equilibrium pressure thereof in the reaction $ThO_2+4C=ThC_2+2CO$ to a temperature in the range of about 2350° K. to 2395° K. whereby said thorite and thorium nitrate are decomposed to form said adherent surface glaze and silicon of the thorite is vaporized therefrom as silicon carbide.

7. The process as defined in claim 6 wherein the temperature to which said element is heated is 2350° K.

CHARLES H. PRESCOTT, JR.

REFERENCES CITED

The following references are of record in the file of this patent:

UNITED STATES PATENTS

| Number | Name | Date |
| --- | --- | --- |
| 369,091 | Bernstein | Aug. 30, 1887 |
| 487,046 | Glegg | Nov. 29, 1892 |
| 841,572 | Rivers | Jan. 15, 1907 |
| 895,531 | Acheson | Aug. 11, 1908 |
| 1,491,224 | Cooper | Apr. 22, 1924 |
| 1,650,577 | Willetts | Nov. 22, 1927 |
| 1,674,961 | Diamond | June 26, 1928 |
| 1,807,915 | Iredell | June 2, 1931 |
| 1,828,767 | Diamond | Oct. 27, 1931 |
| 2,282,098 | Taylor | May 5, 1942 |
| 2,335,325 | Wainer | Nov. 30, 1943 |
| 2,443,798 | Moberly | June 22, 1948 |
| 2,448,685 | Ramadanoff | Sept. 7, 1948 |